United States Patent
Bai et al.

(10) Patent No.: US 7,496,539 B1
(45) Date of Patent: Feb. 24, 2009

(54) SYSTEMS, METHODS AND COMPUTER PRODUCTS FOR PROVIDING TAPE LIBRARY DYNAMIC PRICE PERFORMANCE ENHANCEMENT FEATURE

(75) Inventors: Angqin Bai, Tucson, AZ (US); Shannon H. Chang, Vail, AZ (US); Khanh V. Ngo, Tucson, AZ (US); Jose G. Miranda Gavillan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/120,666

(22) Filed: May 15, 2008

(51) Int. Cl.
*H04K 1/00* (2006.01)
*H04L 9/00* (2006.01)

(52) U.S. Cl. .......................... 705/52; 705/80; 369/29.01
(58) Field of Classification Search .................... 705/52, 705/80; 369/29.01
See application file for complete search history.

(56) References Cited

U.S. PATENT DOCUMENTS

| | | | |
|---|---|---|---|
| 6,434,090 B1 * | 8/2002 | Basham et al. | 369/30.31 |
| 6,842,833 B1 * | 1/2005 | Phillips et al. | 711/162 |
| 6,957,186 B1 * | 10/2005 | Guheen et al. | 705/1 |
| 7,272,081 B2 * | 9/2007 | Goodman et al. | 369/30.27 |
| 7,333,944 B1 | 2/2008 | Harris | |
| 7,334,225 B2 | 2/2008 | Bonnie et al. | |
| 2005/0226059 A1 * | 10/2005 | Kavuri et al. | 365/189.05 |
| 2008/0108405 A1 * | 5/2008 | Brosnan et al. | 463/16 |

FOREIGN PATENT DOCUMENTS

EP 1513057 A2 * 3/2005

OTHER PUBLICATIONS

Babad, Y. M. Pricing Model for a Computer Center. Operations Research, vol. 29, No. 1, Jan.-Feb. 1981 [online], [retrieved Sep. 15, 2008]. Retrieved from the Internet: <http://www.jstor.org/stable/170420>.*

* cited by examiner

*Primary Examiner*—Andrew J. Fischer
*Assistant Examiner*—Jamie Kucab
(74) *Attorney, Agent, or Firm*—Cantor Colburn LLP; Kurt Goudy

(57) ABSTRACT

Dynamic price performance enhancement features and scheduling ranges of input/output performance operating categories and settings for storage solutions are provided by a seller to a purchaser via a program running either remotely on the seller's host system over a communications network or locally on a general purpose computer processor in a tape storage library device. The purchaser is prompted by the seller's system to identify storage device requirements and price constraints. The seller's system provides storage performance operating solutions and negotiates a suitable match between the seller's storage solutions and the purchaser's storage requirements and price constraints. The seller's system finalizes the design of the storage solution and provides a pool of license keys that unlock the storage performance solutions in the tape storage library device that match the purchaser's storage performance requirements and price constraints.

1 Claim, 2 Drawing Sheets

SYSTEMS, METHODS AND COMPUTER PRODUCTS FOR PROVIDING TAPE LIBRARY DYNAMIC PRICE PERFORMANCE ENHANCEMENT FEATURE

TRADEMARKS

IBM® is a registered trademark of the International Business Machines Corporation, Armonk, N.Y., U.S.A. Other names used herein may be trademarks and registered trademarks, or trade or product names of International Business Machines Corporation or other companies.

TECHNICAL FIELD

This invention relates generally to either networked or stand alone computer systems management, software services and applications solutions. More particularly, this invention relates to mass storage input/output (I/O) performance control and upgrade management considerations, at the data storage library level, based on data storage requirements, in light of performance price points. This invention can be applied to any system running any service provider application and/or operating system.

BACKGROUND

Mass storage devices used in computing environments store large amounts of computer readable data for long periods of time and are considered permanent storage devices. Two general categories of mass storage devices include magnetic disc and magnetic tape drives. Variations of each may include removable and non-removable storage capability. Other variations may include but are not limited to hard disks, floppy disks, flash memory, optical discs, magneto-optical discs, magnetic tape, drum memory, punched tape and holographic memory. Typically, magnetic tape drives are the least expensive, in regard to storage capacity, but have high seek time constraints. Thus, disc systems generally have better performance characteristics. Some current tape drive storage customers may not be able to utilize the I/O performance of the latest tape drive device, or they may not want to pay for an expensive high performance tape drive or an expensive high performance disc drive at the time of purchasing an entry level computing and storage system. The entry level computer system customer may want to gradually increase the performance of the storage (i.e., tape drive or disc drive) system as their storage demand increases; thereby paying based on demand.

Therefore, a need exists for a customer to purchase and/or lease a tape drive library capable of containing a bank of tape drives, or a bank of any other storage devices, at a low entry level price point along with entry level performance capabilities that can be changed, i.e., increased, based on increased performance needs along with the ability and/or desire to pay an increased license fee for such increased performance, where payment can be made in any number of lump sums or payment may be made periodically, via a renewable service contract and payment may be made in cash or electronically. In addition, the need exists for a customer to purchase and/or lease a tape drive library, or a library of any other storage devices at a high entry level price along with high level performance capabilities that can be changed, i.e., decreased, based on decreased performance need along with the inability to pay for high performance and/or the desire to pay a decreased license fee for decreased performance, i.e., the ability to pay or receive credit on demand for either increased and/or decreased I/O performance respectively associated with the storage devices in the storage library.

SUMMARY OF THE INVENTION

A method of providing dynamic price performance enhancement features and scheduling ranges of input/output performance operating categories, settings, options and features of mass storage solutions in a storage library device, wherein the storage library device includes a bank of tape drives and a general purpose computer containing a computer executable program that when executed by the general purpose computer, causes the general purpose computer to manage the bank of tape drives by performing the method of dynamic price performance enhancement features and scheduling operations and sub operations. The method is accomplished by initiating a computer executable program residing in either a host computer system and/or a storage library device, containing a general purpose computer. The computer executable program performs operations and sub operations of the method, either remotely over a communications network, including a fiber optic network, where the communications network can be a local area network, such as an intranet or a wide area network, such as an extranet or the Internet. In addition, the computer executable program can perform the method locally, by a computer equipment and services provider, who sells and/or leases computer systems and peripheral devices including storage devices. Furthermore, the seller or the seller's agent, operator, administrator or even the purchaser, buyer, client or lessee or the agent, administrator or operator associated with the purchaser can initiate the computer executable program residing in the general purpose computer processor included in either a stand alone or networked storage library device to perform the method of providing the dynamic price performance enhancement features and scheduling ranges of input/output performance operating categories, settings, options and features of mass storage solutions. The computer executable program when executed either remotely in the computer host system and/or locally in the general purpose computer of the storage library device, causes either the host computer system and/or the general purpose computer processor in the storage library device to perform the following operations and sub operations: The computer executable program causes the general purpose computer of the storage library device system to prompt the purchaser and/or lessee of the storage library device to identify, for the provider, the storage requirements and price constraints of the purchaser and/or the lessee of the storage library device, by automatically prompting the storage library device purchaser/lessee to complete a first on line and/or off line survey/questionnaire thereby populating the on line and/or off line survey/questionnaire with information detailing the purchaser's/lessee's mass storage requirements along with the purchaser's/lessee's pricing and budget constraints, I/O performance, operating categories, settings options and feature solutions required of the storage library device. If the survey/questionnaire is completed off line, in a hardcopy paper format, then the information identified in the off line survey/questionnaire may be captured electronically by an optical scanning device. The information identified by the purchaser and/or lessee and entered into the on line survey/questionnaire by the purchaser/lessee can be viewed by the provider and/or then received, captured and/or stored electronically, by the computer executable program, in repository entry locations of a dynamic repository and subsequently analyzed by the computer executable program. After the analysis is complete, appropriate input/output performance/operating categories, settings, options and features of various mass storage solutions available from the provider along with associated sales and/or leasing prices are automatically selected by the computer executable program and presented to the purchaser via an output device of either the host computer system or the general purpose computer processor of the storage library device. The design of the specific input/output performance/operating categories, settings, options and features along with pricing required by the purchaser are negotiated by automatically prompting the purchaser of the storage device to complete a second on line survey/questionnaire. An electronic sales and/or lease contract for the storage library device and for services related to the storage library device, by the provider are agreed to by both the provider and the purchaser, by automatically prompting both the provider and the purchaser/lessee to enter their respective responses accepting the contract. Upon payment by the purchaser/lessee, where payment may be conducted by known on line secure purchase transactions, the computer executable program finalizes the contract services by matching, using fuzzy matching operations, the input/output performance operating categories, settings, options and features solutions and/or services available from the provider with the storage requirements and price constraints of the purchaser/lessee. The computer executable program generates a pool of license keys which includes an at least one or more license keys which unlock and/or lock, i.e., enable and/or disable respectively the agreed upon input/output performance operating categories, settings, options and feature solutions and/or services available from the provider in the storage library device, upon receipt, by the storage library device, of at least one or more passwords and/or pass codes generated by either the host computer remotely or by the general purpose computer in the storage library device locally, where the passwords and/or pass codes cause the license keys to unlock and/or enable only the negotiated and matched price performance and scheduling options for input/output performance, operating categories, settings, options and feature solutions of one or more tape drives in the bank of tape drives in the storage library device paid for by either the purchaser and/or the lessee of the storage library device and either disabling and maintaining disablement of any available input/output performance, operating categories, settings, options and feature solutions and/or services for one or more of the tape drives in the bank of tape drives, in the storage library device. The enabling and/or the disabling of the storage device may be performed either remotely over the network through a host device driver interface or locally by a library drive interface. The enabling and disabling remotely and/or locally includes receiving a request from one or more tape drives in the bank of tape drives to either enable and disable performance of the one or more tape drives transmitting the request. Further, the computer executable program at any time can operate to renegotiate the dynamic price performance enhancement features and scheduling ranges of input/output performance operating categories, settings, options and features of mass storage solutions to either increase and/or decrease the input/output performance operating categories, settings, options and feature solutions, when the storage requirements of the purchaser change, because the purchaser/lessee wants to add more capacity and performance and/or reduce capacity and performance and/or because the purchaser and/or lessee wants to reduce and/or increase the value of the price performance point of the purchased and/or leased system. Along with providing the pool of license keys for an at least one or more tape drives in the bank of tape drives by one or more performance providing sub operations in a group of performance providing sub operations, the storage library device, such as the tape library, schedules either increased or decreased performance of the at least one or more tape drives, at either the same time and/or different staggered times. The group of performance providing sub operations includes one or more of: providing either increased and/or decreased performance to only one given tape drive, at any one time, of the one or more tape drives in the bank of tape drives, when only one license key is provided from the pool of license keys; and/or providing either increased and/or decreased performance to any one tape drive, at any one time for the one or more tape drives in the bank of tape drives, when only one license key is provided from the pool of license keys; and/or providing either increased and/or decreased performance to any of each of the tape drives of a group of two or more tape drives in the bank of tape drives, when one license key for each of the group of two or more tape drives is/are provided from the pool of license keys; and/or providing either increased and/or decreased performance to each of a first tape drive and a second tape drive of a group of two or more tape drives in the bank of tape drives, when a first license key corresponding to the first tape drive and a second license key corresponding to the second tape drive are provided from the pool of license keys, i.e., on a strict corresponding one-to-one basis; and/or providing, in the pool of license keys, an at least one extra license key more than a number of the at least one or more tape drives in the bank of tape drives. Thus, the storage library device, such as the tape library, causes the bank of tape drives either contained in the storage library device or situated on and communicatively coupled on a network, to operate only within the dynamic price performance enhancement features and scheduling ranges negotiated for, in the storage library device, and which are paid for by the purchaser and/or lessee. The input/output performance operating categories, settings, options and feature solutions and/or services of the storage library device available from the provider include delaying performance of backups and/or initiating performance of backups, staggering the performance of backups and/or providing high performance transfer rates with recursive accumulating backhitches flush, and/or providing low performance transfer rates without recursive accumulating backhitches flush, and/or providing, flexible media capabilities, including long and short length media, and/or providing re-writable and write once read many format, and where one or more of the tape drives are turned on and where one or more of the tape drives are turned off. The dynamic repository included in the storage library device can also be included in a plurality of storage devices connected to the communications network or existing as stand alone units, as well as in the host computer system.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, which are meant to be exemplary, and not limiting, wherein:

DETAILED DESCRIPTION

The disclosed exemplary embodiments are intended to be illustrative only, since numerous modifications and variations therein will be apparent to those of ordinary skill in the art. In reference to the drawings, like numbers will indicate like parts continuously throughout the view. Further, the terms "a", "an", "first", "second" and "third" herein do not denote limitations of quantity, but rather denote the presence of one or more of the referenced item(s).

Figure 1:
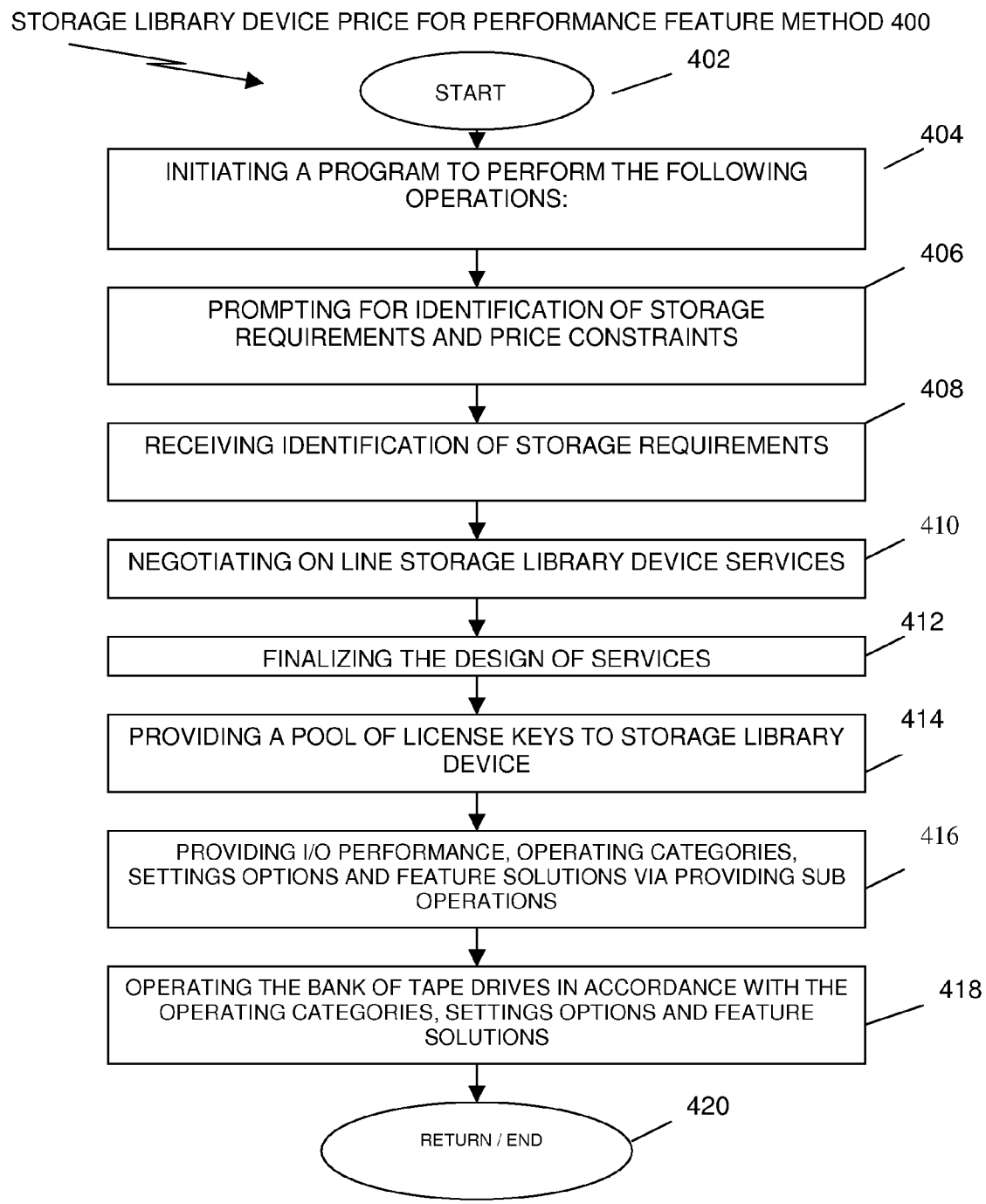
FIG. 1 illustrates operations of a storage library device price performance feature method 400.
Figure 2:
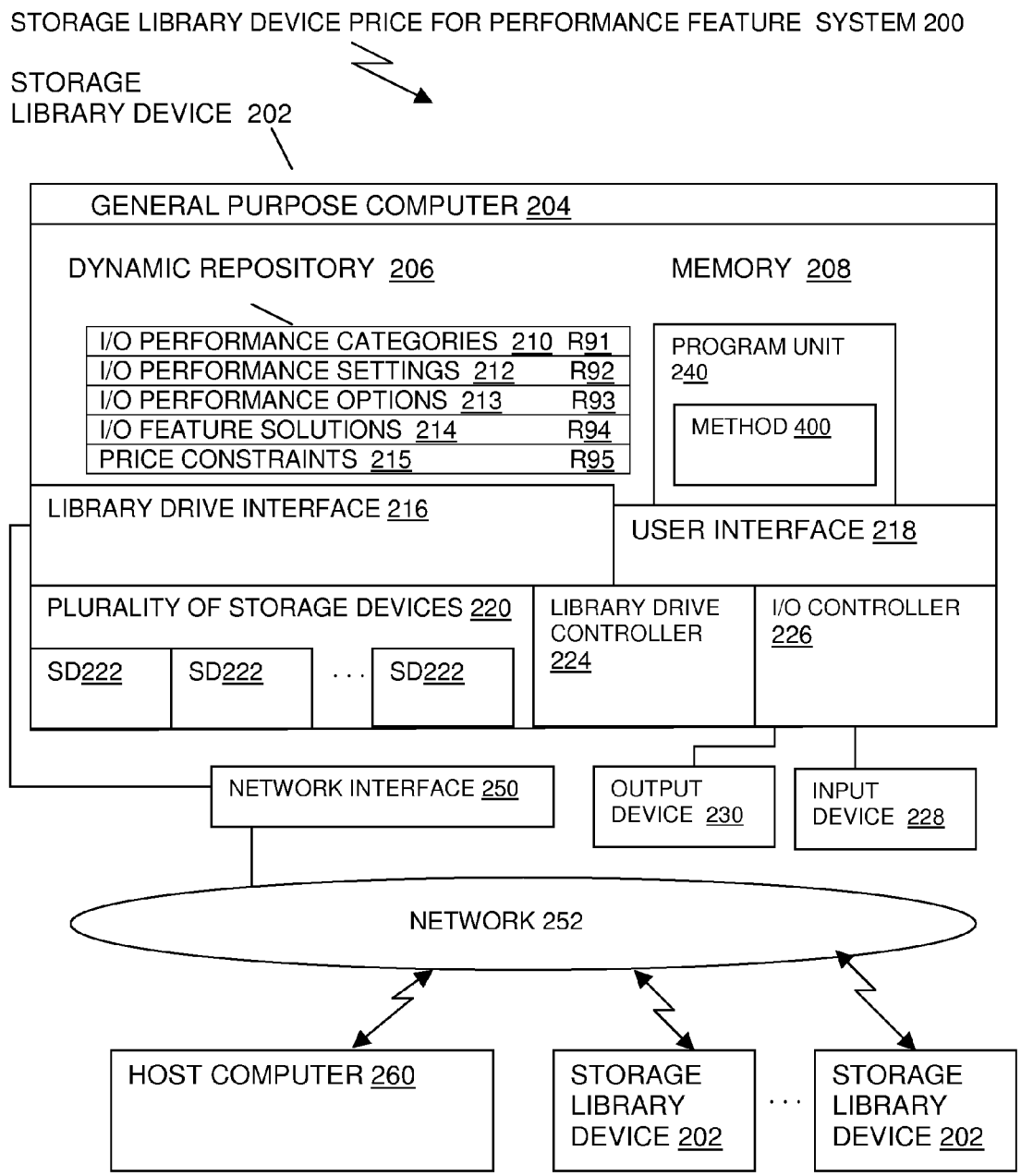
FIG. 2 illustrates a storage library device price performance feature system 200 by which the operations of the method 400 as illustrated in FIG. 1 are implemented.

A storage library device price performance enhancement feature method 400 (herein referred to as "method 400") and a storage library device price performance enhancement feature system 200 (herein referred to as "system 200") using a general purpose computer, such as a general purpose computer 204 residing in a storage library device 202 which may be associated with a host computer system, such as a host computer 260, executing computer executable program code, such as that found in the embodiment of method 400, which causes the general purpose computer 204 and/or the host computer system 260 to perform operations and/or sub operations of the method 400, as illustrated in FIGS. 1 and 2 respectively.

Referring to FIG. 2, system 200 includes a storage library device 202, which can be programmable and which contains a general purpose computer 204. Residing in the general purpose computer 204 is a memory 208. A dynamic repository 206 resides in the memory 208 and the dynamic repository 206 contains a plurality of repository entry locations R91, R92, R93, R94 and R95. The repository entry locations R91-R95 may be expanded up to an extended Rx, depending on the memory capacity of memory 208. The repository entry locations R91, R92, R93, R94 and R95 hold and/or store a plurality of storage library devices, such as storage library device 202, and input output (1/0) performance categories 210, performance settings 212, performance options 213, feature solutions 214 and price constraints 215.

Also, residing in the memory 208 of the general purpose computer 204 is a program unit 240, which contains computer readable and/or computer executable program code such as the program code representing the embodiment of the method 400, operating as a software agent for providing dynamic price performance enhancement features and scheduling ranges of input/output performance operating categories and settings for storage backup solutions, provided by a seller to a purchaser of a storage library device, such as the storage library device 202 either remotely via the seller's host system, such as host computer 260, over a communications network, such as the network 252, or locally on the general purpose computer 204 of the storage library device 202.

The memory 208 can include any one of or combinations of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge or cassette). Moreover, the memory 208 may incorporate electronic, magnetic, optical, and/or other types of storage media. Note that the memory 208 can have a distributed architecture, where various components are situated remotely from one another, but can be accessed by the general purpose computer 204.

In the exemplary embodiment, the general purpose computer 204 includes and/or is connected to a combination of controllers and various interfaces. The combination of controllers may include a library drive controller, such as a library drive controller 224, or the combination of controllers may include a display controller, and/or an input/output (I/O) controller, such as the I/O controller 226, which may also be a display controller. The various interfaces may include a library drive interface 216, a user interface 218, and a network interface 250. The library drive interface 216 is connected in the system 200 to cooperatively communicate with a plurality of storage devices 220, where the plurality of storage devices 220 is composed of any number of storage devices, such as the storage device SD222, which may include tape drives and/or disc drives, depending on the physical capacity of the number of storage device slots available in the storage library device 202. The network interface 250, may include a WIFI interface and/or a universal serial bus interface. In addition, the general purpose computer 202 may include an input device 228 and an output device 230, where the input device 228 may include a mouse, a keyboard, a microphone an optical scanner, a touch screen or other known input devices and the output device 230 may include an audio output device or a printer or a display device.

In the exemplary embodiment, network interface 250 cooperatively couples the general purpose computer 204 to a communications network, such as the network 252. The network 252 may be a wired and/or wireless network including a wide area network such as the Internet or a local area network, including an intranet or an extranet. In addition, the general purpose computer 204 may be cooperatively coupled through the network 252 via the wired and/or wireless technology interfaces to the host computer 260 and/or to other storage library devices 202, throughout the network 252 environment.

Again referring to FIG. 2, the network interface 250 can be, for example but not limited to, one or more buses (such as the universal serial bus) or other wired or wireless connections, as known in the art. The network 252 and/or the network interface 250 may have additional elements, which are omitted for simplicity, such as controllers, buffers (caches), drivers, repeaters, and receivers, to enable communications. Further, the network interface 252 may include address, control, and/or data connections to enable appropriate communications among the aforementioned components.

Referring to FIGS. 1 and 2, in the exemplary embodiment, the method 400 of providing dynamic price performance enhancement features and scheduling ranges of input/output performance operating categories, settings, options and features of mass storage solutions in the storage library device 202, wherein the storage library device 202 includes a bank of tape drives, such as the plurality of storage devices 220 and a general purpose computer 202 containing a computer executable program, such as embodied in the method 400 that when executed by the general purpose computer 204, causes the general purpose computer 204 to manage the bank of tape drives, such as the plurality of storage devices 220, by delivering and/or providing the dynamic price performance enhancement features and scheduling of the bank of tape drives, such as the plurality of storage devices 220.

Referring to FIG. 1 and FIG. 2, at the operation start 402, of the method 400, the system 200 receives a signal from a provider, supplier or seller/user of the storage library device 202 from an input device, such as described by the input device 228 including, but not limited to, a mouse or keyboard, which can be used to activate the program code of method 400, where method 400 is stored as executable program code on a computer executable medium in program unit 240. Upon activation, the program code of method 400 performs other selections in method 400 from additional selection signals received from the input device 228, causing the program code of the method 400 to be executed by the general purpose computer 204 to operate as a software agent in performing the operations of method 400 of providing the dynamic price performance enhancement features and scheduling of the bank of tape drives, such as the plurality of storage devices 220.

Again referring to FIG. 1 and FIG. 2, at the operation initiating a program to perform the following operations 404 (hereafter referred to as "operation 404"), the program code of the method 400 executed by the system 200 causes the general purpose computer 204 of the system 200 to initiate the computer executable program code (containing computer readable program code) residing in either a host computer system, such as the host computer 260 and/or residing in the storage library device 202, where both contain a general purpose computer, such as the general purpose computer 204. The computer executable program code performs operations and sub operations of the method 400, either remotely over a communications network, such as the network 252, including a fiber optic network, where the communications network can be a local area network, such as an intranet or a wide area network, such as an extranet or the Internet. In addition, in the exemplary embodiment, the computer executable program code can perform the operations of the method 400 locally, by a computer equipment and services provider, who sells and/or leases computer systems and peripheral devices including storage library devices, such as the storage library device 202.

In the exemplary embodiment, the seller or the seller's agent, operator, administrator or even the purchaser, buyer, client or lessee or the agent, administrator or operator associated with the purchaser can initiate the computer executable program code of method 400 residing in the general purpose computer 204 included in either a stand alone or networked storage library device, such as the storage library device 202 to perform the operations and sub operations of the method 400 of providing the dynamic price performance enhancement features and scheduling ranges of input/output performance operating categories, settings, options and features of mass storage solutions. Thus, the computer executable program code of the method 400 when executed either remotely in the computer host 260 and/or locally in the general purpose computer 204 of the storage library device 202, causes either the host computer 260 and/or the general purpose computer 204 in the storage library device to perform the following operations and/or sub operations of the method 400.

Referring to FIG. 1 and FIG. 2, at the operation prompting for identification of storage requirements and price constraints 406 (hereafter referred to as the "operation 406"), the computer executable program code of the method 400 causes the general purpose computer 204 of the system 200 to prompt the purchaser and/or lessee of the storage library device 202 to identify, for the provider, the storage requirements and price constraints of the purchaser and/or the lessee of the storage library device 202, by automatically prompting the purchaser/lessee the storage library device 202 to complete a first on line survey/questionnaire, thereby populating the on line survey/questionnaire with information detailing the purchaser's/lessee's mass storage requirements along with the purchaser's/lessee's pricing and budget constraints, I/O performance, operating categories, settings options and feature solutions required for the storage library device 202.

Referring to FIG. 1 and FIG. 2, at the operation receiving identification of storage requirements 408 (hereafter referred to as the "operation 408"), the computer executable program code of the method 400 causes the general purpose computer 204 of the system 200 to receive the information identified by the purchaser and/or lessee and entered into the on line survey/questionnaire by the purchaser/lessee. This identified information can be viewed by the provider and/or received, captured and/or stored electronically, by the computer executable program code of the method 400, in repository entry locations R91, R92, R93, R94 and R95 of a dynamic repository 206 and subsequently analyzed by the computer executable program code of the method 400, where the method 400 can call an algorithm associated with the method 400 to perform the analysis. The identified information includes I/O performance categories 210, which can be stored in the repository entry location R91. The identified information further includes I/O performance settings 212, which can be stored in the repository entry location R92. The identified information further includes I/O performance options 213, which can be stored in the repository entry location R93. The identified information further includes I/O performance solutions 214, which can be stored in repository entry location R94. And, the identified information further includes price constraints 215, which can be stored in the repository entry location R95.

In the exemplary embodiment, after the computer executable program code of the method 400 completes the analysis of the identified information in light of the available input/output performance/operating categories, settings, options and features of various mass storage solutions, which are available from the seller/provider, then the program code of the method 400 determines appropriate and/or suitable input/output performance/operating categories, settings, options and features of various mass storage solutions available from the provider along with associated sales and/or leasing prices and the computer executable program code of the method 400 automatically selects and presents to the purchaser, these determined appropriate and/or suitable input/output performance/operating categories, settings, options and features of various mass storage solutions, via an output device, such as the output device 230 of either the host computer system and/or the general purpose computer processor of the storage library device 220.

Referring to FIG. 1 and FIG. 2, at the operation negotiating on line services 410 (hereafter referred to as the "operation 410"), the computer executable program code of the method 400 causes the general purpose computer 204 of the system 200 to further negotiate the determined specific input/output performance/operating categories, settings, options and feature solutions and/or services along with pricing required by the purchaser, by automatically prompting the purchaser, of the storage library device 202, by the general purpose computer 204, by way of the output device 230, to complete a second on line survey/questionnaire. An electronic sales and/or lease contract for the storage library device 202 and an electronic sales and/or lease contract for services related to the storage library device 202, are generated and presented by the provider to the purchaser/lessee either in electronic form or in hardcopy paper form by the output device 230. The purchaser/lessee and the provider are prompted to indicate their agreement, i.e., accepting the electronic sales and/or lease contract or the hardcopy paper contract, in regard to the on line survey/questionnaire. If the provider and the purchaser/lessee cannot agree on the terms of the sales and/or lease contract, the computer executable code of the method 400 continues to prompt the provider and/or purchaser/lessee for continued input and identification of information, until an agreement can be reached by the provider and the purchaser/ lessee; or, if still no agreement can be reached, then the computer executable code causes the operations of the method 400 to end.

Referring to FIG. 1 and FIG. 2, at the operation finalizing the design of services 412 (hereafter referred to as the "operation 412"), the computer executable program code of the method 400 causes the general purpose computer 204 of the system 200 to, upon mutual agreement between the provider and the purchases/lessee as to the contract terms and upon payment by the purchaser/lessee, where payment may be conducted by known on line secure purchase transactions and/or off line payment methods, the computer executable program finalizes the I/O performance, operating categories, settings options and feature solutions and/or services contract by matching, using fuzzy matching operations, the input/output performance operating categories, settings, options and features solutions available from the provider with the storage requirements and price constraints of the purchaser/lessee, by using the identified information data stored in the repository entry locations R91, R92, R93, R94 and R95 including I/O performance categories 210, I/O performance settings 212, I/O performance options 213, I/O feature solutions 214 and price constraints 215 respectively, where the provider's/seller's product information and pricing information may be incorporated as part of the program code of the method 400 or may be stored in memory and/or stored in an algorithm and called and/or accessed by the program code of the method 400, in order to complete the analysis and matching of the identified user/purchaser/lessee information.

Referring to FIG. 1 and FIG. 2, at the operation providing a pool of license keys 414 (hereafter referred to as the "operation 414"), the computer executable program code of the method 400 causes the general purpose computer 204 of the system 200 to generate a pool of license keys, upon notification of receipt of payment, using known methods of on line and/or off line payment, by the seller, from the purchaser and/or lessee for the input/output performance, operating categories, settings, options and feature solutions services. The pool of license keys includes an at least one or more license key and/or keys which unlock and/or lock, i.e., enable and/or disable respectively the agreed upon input/output performance operating categories, settings, options and feature solutions available from the provider/seller/lessor in the storage library device 202, upon receipt, by the general purpose computer 204 in storage library device 202, of at least one or more passwords and/or pass codes generated by either the host computer 260 remotely or generated by the general purpose computer 204 in the storage library device 202 locally, where the passwords and/or pass codes cause the license keys to unlock and/or enable only the negotiated and matched price performance and scheduling options for input/output performance, operating categories, settings, options and feature solutions of one or more storage devices, such as the SD222 tape drives, in the bank of tape drives, such as the plurality of storage devices 220 in the storage library device 202 paid for by either the purchaser and or the lessee of the storage library device 202 and either disabling and maintaining disablement of any available input/output performance, operating categories, settings, options and feature solutions of one or more of the tape drives in the bank of tape drives in the storage library device 202. The enabling and/or the disabling of the storage library device 202 may be performed either remotely over the network 252 through a host device driver interface and communicated to the general purpose computer 204 of the storage library device 202 via the network interface 250 or the enabling and/or the disabling of the storage library device 202 may be performed locally by a library drive interface 216. The enabling and disabling remotely and/or locally includes receiving a request from one or more tape drives, such as the storage device SD222 in the bank of tape drives, such as the plurality of storage devices 220 to either enable and/or disable performance of the one or more tape drives, such as the storage device SD222 transmitting the request.

In the exemplary embodiment, the computer executable program at any time can operate to renegotiate the dynamic price performance enhancement features and scheduling ranges of input/output performance operating categories, settings, options and features of mass storage solutions to either increase and/or decrease the input/output performance operating categories, settings, options and feature solutions, when the storage requirements of the purchaser change, because the purchaser/lessee wants to add more capacity and performance and/or reduce capacity and performance and/or because the purchaser and/or lessee wants to reduce and/or increase the price performance point of the purchased and/or leased system. Along with providing the pool of license keys for an at least one or more tape drives (such as the storage device SD222) in the bank of tape drives (such as the plurality of storage devices 220) by one or more performance providing sub operations in a group of performance providing sub operations, where the library tape device (such as the storage library device 202) schedules either increased or decreased performance of the at least one or more tape drives (such as the storage device SD222) at either the same time and/or different staggered times.

Referring to FIG. 1 and FIG. 2, at the operation providing I/O performance, operating categories, settings options and feature solutions via providing sub operations 416 (hereafter referred to as the "operation 416"), the computer executable program code of the method 400 causes the general purpose computer 204 of the system 200 to perform providing sub operations including one or more of:

providing either increased and/or decreased performance to only one tape drive, such as the storage device SD222, at any one time, of the one or more tape drives, in the bank of tape drives, such as the plurality of storage devices 220, when only one license key is provided from the pool of license keys; and/or providing either increased and/or decreased performance to any one tape drive, such as the storage device SD222, at any one time of the one or more tape drives, in the bank of tape drives, such as the plurality of storage devices 220, when only one license key is provided from the pool of license keys; and/or providing either increased and/or decreased performance to any of each of the tape drives, such as the storage device(s) SD222, in the bank of tape drives, such as the plurality of storage devices 220, when one license key for each of the group of two or more tape drives, such as for the storage device(s) SD222 is/are provided from the pool of license keys, i.e., on a general one-to-one basis, which may be expensive; and/or providing either increased and/or decreased performance to each of a first tape drive, such as the storage device SD222, and a second tape drive, such as the storage device SD222, of a group of two or more tape drives in the bank of tape drives, such as the plurality of storage devices 220, when a first license key corresponding to the first tape drive, such as the storage device SD222, and a second license key corresponding to the second tape drive, such as the storage device SD222, are provided from the pool of license keys, i.e., on a strict corresponding one-to-one basis, which may also be expensive; and/or providing, in the pool of license keys, an at least one extra license key more than a number of the at least one or more tape drives, such as the storage device SD222 in the bank of tape drives, such as the plurality of storage devices 220, where the at least one extra license key allows for expansion capability and/or capacity of the number of tape drives, such as the storage devices SD222 in the plurality of storage devices 220, in the library tape device, such as the storage library device 202.

Referring to FIG. 1 and FIG. 2, at the operation, operating the bank of tape drives in accordance with the operating categories, settings options and feature solutions 418 (hereafter referred to as the "operation 418"), the computer executable program code of the method 400 causes the general purpose computer 204 of the system 200 to cause the bank of tape drives, such as the plurality of storage devices 220, in the library tape device, such as the storage library device 202, to operate only within the dynamic price performance enhancement features and scheduling ranges negotiated for in the storage library device 202, which are paid for by the purchaser and/or lessee. The input/output performance operating categories, settings, options and feature solutions of the storage device available from the provider include delaying performance of backups and/or initiating performance of backups, staggering the performance of backups and/or providing high performance transfer rates with recursive accumulating backhitches flush (RABF), and/or providing low performance transfer rates without RABF, and/or providing, flexible media capabilities including long and short length media, and/or providing re-writable and write once read many (WORM) format, and where one or more of the tape drives in the library tape device are turned on and where one or more of the tape drives in the library tape device are turned off.

The dynamic repository included in the storage library device 202 may also be included in the plurality of storage devices 220, as well as the host computer 260 and additional storage library devices 202, all of which may be communicatively connected to the communications network, such as the network 252 or which may operate as existing stand alone units.

Referring to FIG. 1 and FIG. 2, at the operation return/end 420 (hereafter referred to as the "operation 420"), the computer executable program code of the method 400 causes the general purpose computer 204 of the system 200 to return to any of the above operations and/or sub operations to continue iteratively processing and performing said operations and/or sub operations for additional provision of I/O performance, operating categories, settings options and feature solutions, or the method 400 can direct the system 200 to end.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of managing dynamic price performance enhancement features and scheduling ranges of input/output performance, operating categories, settings, options and feature solutions in a storage library device, wherein the storage library device includes a bank of tape drives and a general purpose computer containing a computer executable program that when executed by the general purpose computer, causes the general purpose computer to manage the bank of tape drives by performing the method comprising:

initiating, one of remotely over a network and locally in the storage library device, by one of a provider and a purchaser and a lessee of the storage library device, the computer executable program, which when executed by one of a host computer system in communication with the general purpose computer installed in the storage library device and executed locally by the general purpose computer in the storage library device, causing one of the host computer system and the general purpose computer in the storage library device to perform the operations of:

prompting, by the computer executable program in the general purpose computer, one of the purchaser and the lessee of the storage device to complete a first on line questionnaire, requesting identification of storage requirements and price constraints, I/O performance, operating categories, settings options and feature solutions required of the storage library device;

receiving by the storage library device, identification, of storage requirements and price constraints I/O performance, operating categories, settings options and feature solutions required of the storage library device by one of the purchaser and the lessee of the storage device;

negotiating, in one of an electronic sales and lease contract agreement for the storage library device and for input/output performance, operating categories, settings, options and feature solutions services related to the storage library device, by the provider with one of the purchaser and the lessee of the storage library device, by prompting, automatically, one of the purchaser and the lessee of the storage device to complete a second on line questionnaire;

finalizing design of input/output performance, operating categories, settings, options and feature solutions services to storage requirements of one of the purchaser and the lessee of the storage library device, by receiving the first and second questionnaires from the purchaser of the storage library device and matching, results from the first and second questionnaires including price constraints with available input/output performance, operating categories, settings, options and feature solutions, wherein matching includes using fuzzy matching operations;

providing by the seller, upon receipt of payment by one of the purchaser and lessee for input/output performance, operating categories, settings, options and feature solutions services, a pool of license keys which includes an at least one or more license keys, associated with an at least one or more passwords corresponding to the one or more license keys, to the general purpose computer installed in the storage library device, upon receipt, by the general purpose computer, of the at least one or more passwords, causing the general purpose computer to enable by unlocking only negotiated and matched input/output performance, operating categories, settings, options and feature solutions of one or more storage drives in the bank of tape drives in the storage library device paid for by one of the purchaser and the lessee of the storage library device and one of disabling and maintaining disablement of any available input/output performance, operating categories, settings, options and feature solutions, of one or more storage drives in the bank of tape drives, not negotiated and agreed upon, wherein the at least one or more license keys provided are generated by the computer executable program code executed by one of the host system and the general purpose computer processor in the storage library device, wherein enabling and disabling of the bank of tape drives in the storage library device are performed by one of remotely by the host over the network including fiber optic links through a host device driver interface and locally by a library drive interface, wherein negotiated input/output performance, operating categories, settings, options and feature solutions and one or more storage drives in the bank of tape drives in the storage library device are renegotiated to one of increase and decrease input/output performance, operating categories, settings, options and feature solutions when storage requirements of one of the purchaser and the lessee of the storage device change by one of increasing and decreasing, wherein one of enabling and disabling remotely and locally includes receiving a request from one or more tape drives in the bank of tape drives to one of enable and disable performance of the one or more tape drives transmitting the request, wherein providing the pool of license keys for an at least one or more tape drives in the bank of tape drives by one or more performance providing sub operations in a group of performance providing sub operations, wherein the library tape device schedules one of increased and decreased performance of the at least one or more tape drives at one of the same time and different staggered times and wherein the group of performance providing sub operations includes one or more of:

providing one of increased and decreased performance to only one tape drive of the one or more tape drives in the bank of tape drives, when only one license key is provided from the pool of license keys;

providing one of increased and decreased performance to any one tape drive of the one or more tape drives in the bank of tape drives, when only one license key is provided from the pool of license keys;

providing one of increased and decreased performance to any of each tape drive of a group of two or more tape drives in the bank of tape drives, when one license key for each of the group of two or more tape drives is provided from the pool of license keys;

providing one of increased and decreased performance to each of a first tape drive and a second tape drive of a group of two or more tape drives in the bank of tape drives, when a first license key corresponding to the first tape drive and a second license key corresponding to the second tape drive are provided from the pool of license keys, on a strict corresponding one-to-one basis; and providing, in the pool of license keys, an at least one extra license key more than a number of the at least one or more tape drives in the bank of tape drives; and operating the bank of tape drives in the library tape device within dynamic price performance enhancement features and scheduling ranges of input/output performance, operating categories, settings, options and features solutions provided in the storage library device, and wherein negotiated input/output performance, operating categories, settings, options and feature solutions are paid for by one of the purchaser and the lessee of the library tape device, wherein input/output performance, operating categories, settings, options and feature solutions include one or more of delaying performance of backups and initiating performance of backups, providing high performance transfer rates with recursive accumulating backhitches flush, providing low performance transfer rates without recursive accumulating backhitches flush, providing flexible media capabilities including exchanging long media for short media and short length media for long media, and providing re-writable and write once read many format, and wherein one or more of the tape drives in the library tape device are turned on, wherein one or more of the tape drives in the library tape device are turned off.

* * * * *